(12) United States Patent
Alling

(10) Patent No.: US 7,333,945 B1
(45) Date of Patent: Feb. 19, 2008

(54) CHEMICAL PRODUCT ACQUISITION SYSTEM

(75) Inventor: Eric R. Alling, Upton, MA (US)

(73) Assignee: Shipley Company, L.L.C., Marlborough, MA (US)

( * ) Notice: Subject to any disclaimer, the term of this patent is extended or adjusted under 35 U.S.C. 154(b) by 821 days.

(21) Appl. No.: 09/722,130

(22) Filed: Nov. 24, 2000

(51) Int. Cl.
*G06Q 30/00* (2006.01)

(52) U.S. Cl. .......................... 705/26; 705/27

(58) Field of Classification Search ............... 705/26, 705/27
See application file for complete search history.

(56) References Cited

U.S. PATENT DOCUMENTS

| | | | | |
|---|---|---|---|---|
| 5,311,437 | A * | 5/1994 | Leal et al. | 700/106 |
| 5,592,375 | A * | 1/1997 | Salmon et al. | 705/7 |
| 6,282,550 | B1 * | 8/2001 | Venkatesan et al. | 707/104.1 |
| 6,484,169 | B1 * | 11/2002 | Wilsford | 707/6 |
| 6,882,980 | B1 * | 4/2005 | Schuller | 705/26 |
| 7,113,919 | B1 * | 9/2006 | Norris et al. | 705/26 |
| 2001/0032189 | A1 * | 10/2001 | Powell | 705/59 |

FOREIGN PATENT DOCUMENTS

JP    2003-187032    * 7/2003

OTHER PUBLICATIONS

"Database for plastic Stock Shapes" (Johnson, Dana. Oct. 2000. Plastics Engineering.*

"Chemical E-Commerce Models Emerge" (Blake, Patrick. Feb. 14, 2000. Chemical Market Reporter).*

"Database Management Systems: Linking up a company's communications, both external and internal" (Kruk, Art et al. May 1996. Chemical Engineering).*

"Rolling out the strategies of chemical dot-coms" (Boswell, Clay. Apr. 17, 2000. Chemical Market Reporter).*

"Producers, Third-party Exchanges Gear up for the online buy" (Reilly, Christopher. Dec. 16, 1999. Purchasing).*

"Materials database" May 1995. Mechanical Engineering.*

* cited by examiner

*Primary Examiner*—Mark Fadok
(74) *Attorney, Agent, or Firm*—Marisa J. Dubuc; S. Matthew Cairns

(57) ABSTRACT

A computerized data processing system can assist a user in locating specialty chemical products having particular intrinsic properties specified by the user. The system can query a database to identify commercially available chemical product(s) that best conform to the intrinsic properties identified by the user. Query results are sent to a client computer for presentation to a user. In some cases, the user may request formulation of a new product conforming to the search parameters. The ability to automatically request formulation of a new product can assist the user where, for example, the commercially available chemical products do not adequately conform to the desired properties. This formulation request is received at the server and a formulator database is queried to select a set of experts with appropriate product formulation skills. The system can then automatically distribute the user's formulation request to each of these experts.

10 Claims, 1 Drawing Sheet

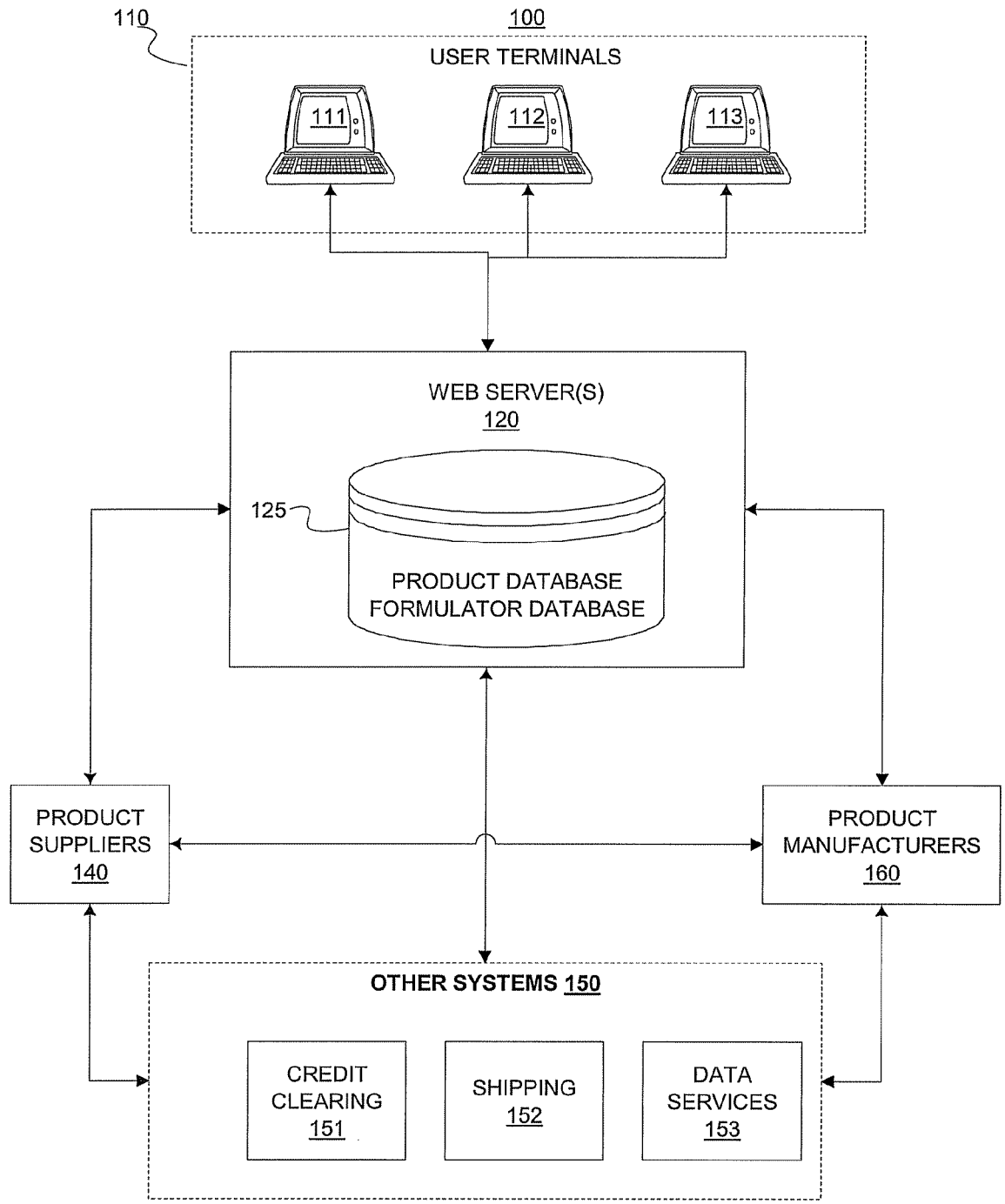
FIGURE

CHEMICAL PRODUCT ACQUISITION SYSTEM

BACKGROUND OF THE INVENTION

Electronic commerce (e-commerce) is changing the way in which industries provide business services. E-commerce web sites, web portals, and other electronic purchasing systems can automate purchasing transactions and comparison shopping. Typical automated purchasing systems are designed for the purchase of known product configurations and commodity items. For products requiring specialized preparation, testing, handling, and care, or for which unknown factors need to be determined, traditional e-commerce system designed for pre-configured product sales and distribution may be inappropriate. Consequently, improved e-commerce systems able to handle more complex product sales and configuration issues are desired.

SUMMARY OF THE INVENTION

In general, in one aspect, the invention features computer-implemented transaction processing to assist a user in locating chemical products having a set of desired properties. These properties include properties that are intrinsic to the chemical products. The processing includes receiving a product request at a server. The product request includes parameters that identify the desired properties. A database is queried to identify commercially available chemical product (s) that best conform to the identified intrinsic properties, and a result of the query is sent to a client computer for presentation to a user. Following presentation of the results to the user, the user may request formulation of a new product conforming to the search parameters. The ability to automatically request formulation of a new product can assist the user where, for example, the commercially available chemical products do not adequately conform to the desired properties. This formulation request is received at the server and a formulator database is queried to select a set of experts with appropriate product formulation skills. The server can then distribute the user's formulation request to each of these experts.

The intrinsic properties include properties inherent to chemical products (for example, chemical compatibility properties, performance properties, chemical reactivity properties and physical properties such as density and volume). In some implementations, non-intrinsic properties (such as price and brand-name) can also be specified. Querying the product database includes selecting chemical product based on conformance of the designated intrinsic chemical properties with the search parameters. Conformance does not require precise matching but rather can be a measure of how closely the desired properties are matched by actual product properties. This measurement can be based on a weighted score of particular properties. The query results may be presented to a user using a web page formatted by the server.

In some implementations, formulation request can be distributed to a network of formulators (including, e.g., commercial product vendors, formulation experts, independent chemist, and others). This distribution can be automated (e.g., by e-mail, FAX, automatically generated mailings, or by postings to newsgroups and/or by messages posted to formulator login accounts). To determine appropriate formulators to which the formulation request is to be distributed, a database of formulators is searched. The formulator database designates qualification of the potential formulators. This qualification data can include each formulator's field(s)-of-expertise (e.g., organic chemistry, solvents, coatings, etc) as well as other parameters. The formulator qualification data may be matched to parameters of the user's product search request. For example, the user's product search request parameters can include a application-type parameter (e.g., solvent, coating, etc) which may be compared to the formulator's field-of-expertise to determine potential formulators. Formulator qualifications can also be identified by data about formulations previously developed by each formulator (i.e., the intrinsic properties of previously developed products and formulations).

The details of one or more embodiments of the invention are set forth in the accompanying drawings and the description below. Other features, objects, and advantages of the invention will be apparent from the description and drawings, and from the claims.

DESCRIPTION OF THE DRAWINGS

FIG. 1 is diagram of a computer network.

DETAILED DESCRIPTION OF THE INVENTION

Industries and businesses use chemical products for a various specialty applications including, among others, semiconductor manufacturing, synthesis of drugs and other medical products, and production of industrial coatings (such as sealant and paint products). In these and other industries, users may require precise control and selection of chemical compatibility properties, performance properties, chemical reactivity properties, physical properties (e.g., density and volume) and other intrinsic properties of the chemicals used. In some cases, readily available commodity products may be inadequate to meet these needs and, consequently, the users rely on specialty chemical products suppliers. Specialty chemical product may be sold through limited channels or available from a limited number of suppliers and locating suppliers for these products can be difficult. In other cases, commercial suppliers for a desired product may not exist, and custom formulation of chemical products is needed. Processes to locate specialty product suppliers, and to solicit custom formulation and/or production of specialty chemical products can be assisted by a computer-implemented system to match user needs to available products and product suppliers and to locate experts that can assist in the production of suitable products.

A web-based electronic commerce (e-commerce) system can be used to assist users in locating specialty chemical products and suppliers and to locate experts that can assist in the formulation and production of suitable products. FIG. 1 shows an example web-based e-commerce system architecture. The system 100 include a web server 120 coupled to a database system 125. The database system 125 stores a product database and a database of formulation experts (a "formulator database"), as well as other data. The product database includes data about commercially available chemical products and their properties. The formulator database identifies chemical product formulators (e.g., chemist) and details the skills, experience, and/or other detail characteristics of the formulator's expertise. The web server 120 is connected over the Internet or other network to one or more user terminals 111-113. The server 120 also can interface to material supplier databases 140, production and product manufacturer systems 160 as well as to other computer systems 150 (e.g., credit clearinghouses 151, common carrier shipping systems 152, information data services 153, etc.).

The web server 120 provides HTML pages and forms to user terminals 111-113, thereby allowing the server 120 to exchange product, service, and purchase data with users of the terminals 111-113. The exchanged data can include queries about particular products, purchaser identification, registration, and logon information, selection of desired products and product volume, shipping address information, a designation of a preferred shipper, and a designation of a preferred manufacturer. Other conventional commerce-related data also can be exchanged between the web server 120 and the user terminals 111-113. For example, the server 120 may receive purchase order information from user terminal 111 and verify the purchaser's credit and/or draw funds by interacting with a credit card transaction clearinghouse system 151, schedule product delivery by exchanging data with a shipping system computer 152 and with a product supplier 140. Data exchanged with systems 140, 150, 160 can be used to schedule merchandise pick-up and delivery, to confirm stock levels, determine pricing, and/or for other purposes.

The database system 125 includes a product database that stores data about commercially available chemical products (i.e., products based on existing chemical formulations). The data in the product database includes data about properties that are inherent to each of these chemical products (i.e., the "intrinsic properties" of the chemical products). A representative set of intrinsic properties includes chemical compatibility properties, performance properties, chemical reactivity properties, physical properties such as density and volume, and product composition (e.g., a listing of the raw materials used to formulate each product), resistance to thermal flow, transparency, lubricity, hardness, conductivity, resistivity, and information about a product's characteristics after exposure to various temperatures or processing steps, to name a few. Data about extrinsic properties can also be included in the product database. Extrinsic properties includes properties that are not directly related to the chemical constituents and structure, performance characteristics and other properties of the products (such as price, supplier, usage, and marketing information).

The server 120 can interact with users at terminals 111-113 to receive product and material purchase orders. The server can process a purchase order by displaying product catalogs, receiving user selections of particular products, and collecting purchase, shipping, and payment information from a user. A user may also input a product identifier (e.g., a brand name or manufacturer's code) to query the product database for suppliers of specialty products or to reorder a material previously supplied through the system 100. The system 100 also can be used to search for chemical products based on the intrinsic properties needed by a user in a chemical product. This capability can be used where, for example, the user cannot specially identify a product meeting the user's needs, but can identify the desired characteristics of such a product. To search for a chemical product by inputting search parameters specifying characteristics of the desired product. The user's input may be received at the terminals 111-113 and transmitted to server 120 using a web browser and a hypertext markup language-based form received from the server 120. In some implementations, the search parameter input fields that are displayed to a user may be dynamically changed depending on inputs provided by the user. Thus, particular input fields can be hidden or shown to the user depending on choices and data input to other fields. Thus, the user input form can be automatically customized depending as data is entered into input form fields. One application of this dynamic updating is to ensure that the parameters requested from a user are appropriate, given choices made by the user. Thus, for example, if a user indicates that the desired product is a latex paint product (a coating), the input form provided by the system 100 can suppress input fields that are not relevant to latex paint products. If "coating" is selected, the input form may be dynamically updated to request parameters relevant to coatings. On the other hand, if "solvent" is selected, the input form can be dynamically updated to request parameters relevant to solvents. This dynamic updating can be implemented, e.g., using dynamic hypertext markup language (DHTML), JavaScript(198 ), Microsoft Visual Basic Script, Java applets, and other scripting and programming technologies.

Implementations may collect different search parameters from users depending, e.g., on the parameters relevant to the chemical industries that are targeted by the implementation and, correspondingly, the chemical products in the product database. The following are classes of exemplary input parameters:

- A field-of-use classification—This data can be used to specify the desired application for the product. For example, a user can select whether the desired product is to be used as a coatings, a solvent, adhesive, lubricant, imageable polymers, insulating materials, dilutents, or for some other use.
- Compatibility properties—For example, miscibility, reactivity, non-reactivity, hydrolysis, polarity differentials, and bonding potential.
- Application environment properties—specifies the environment in which a product is to be used. For example, application environment properties may identify a temperature range at which the product is to be used. In the case of coatings, indoor or outdoor use may be indicated. Other environmental conditions include pressure conditions (e.g.: hydraulics fluids and lubricants), withstanding reactive plasma environments, humidity.
- Performance properties—performance properties can be used to specify the product's performance under different conditions. Example performance properties include adhesive strength, lubricity, resistance to thermal flow, imaging capability/resolution.
- Chemical reactivity properties. Example properties include solvency, molecular bond strength, percipitation, co-solvency.
- Other physical properties. Implementations may permit other physical properties (such as density, volume, reflectivity, morphology, and surface roughness) to be specified by a user.

The search parameters that are input by the user are transmitted to the server 120 where they are processed to locate conforming products. This processing includes querying the product database 125 to obtain data records specifying characteristics of known chemical products. These data record stores information that can be compared to the search parameters received from a user. The specific information in each data record can vary in different implementations and for different product types. Thus, if an implementation receives field-of-use and application temperature information from a user, then the chemical product data records will each specify a field-of-use and application temperature range (or data that can be used to derive the relevant information).

| Record Field | Example Data |
| --- | --- |
| Application_Surface | Silicon Wafer |
| Material_Classification | Inorganic Mixture |
| Primary_Material_Constituent | Methyl Silsesquioxane |
| Secondary_Material_Constituent | PGMEA |
| Solvent_Compabitility | Ethyl lactate, 2-Ethyoxy Propanol |
| Physical_Properties:Viscosity | 15 centipoise |
| Physical_Properties:Tg | 380 degrees Celsius |
| Resistance_to_Thermal_Flow_After_Cure | 450 deg C. |
| Dielectric_Constant | 2.5 |
| Youngs_Modulus | 3.5 GPa |
| Coefficient_Of_Thermal_Expansion | 1 ppm |

When specifying the intrinsic criteria used by the server 120 to locate available products in the product database, the user may designate certain criteria as mandatory and other criteria as permissive. Mandatory criteria is criteria that must be met in a product in order to satisfy the user's search criteria. Permissive (i.e., preferred) criteria is criteria that is desired by the user, but which need not be exactly met. The system can select products in the product database 125 by selecting all products matching the mandatory criteria specified by the user, and then ranking the selected products based on how closely they meet the permissive criteria. Consider, for example, a search request that includes mandatory criteria indicating that (i) the desired product is classified as a coating and (i) the product is to be used on a application surface of wood, and permissive criteria specifying a drying time of less than 30 minutes at 28 degrees Celsius and an optical transmittance greater than 95% at a wavelength of 436 nm. To process this request, the system 120 select from the product database all floor coatings suitable for use on wood surfaces, and then rank the selected solvents based on whether they have a drying time of <30 minutes and optical transmittance of >95% at a wavelength of 436 nm. Thus, a coating with a <30 minute drying time at 28 degrees Celsius and optical transmittance >95% at a wavelength of 436 nm will be ranked higher than coating with a drying time of 45 minutes and an optical transmittance >95% at a wavelength of 436 nm.

Product rankings can be determined by computing a ranking value. The ranking value indicates the degree to which intrinsic characteristics of the products in the product database deviate from the target intrinsic characteristics values set by the user. For numeric parameters, the rank value may be calculated as:

$$\text{Rank Value} = \frac{\text{target value} - \text{actual value}}{\text{target value}},$$

for target values > actual product values;

and $$\text{Rank Value} = \frac{\text{target value}}{\text{actual value}}, \text{for target values} < \text{actual product values};$$

For non-numeric values, the system can use a lookup table to translate a non-numeric values into numeric values. If there are multiple permissive criteria, a weighing value may be specified for each criteria to indicate a relative importance to the user and the system can compute an aggregate rank value to determine the ranking of products. For example, if there are two permissive criteria, and the first criteria is more important than the second, the user may specify a weight of 1.0 for the first criteria, and a relative weight of 0.7 for the second criteria. An aggregate ranking value is then determined by multiplying the weight value associated with each permissive criteria by the rank value computed for that criteria.

$$\text{Aggregate Rate Value} = \sum_{\text{All Permissive Critiera}} \text{Rank Value} * \text{Weight}$$

The search results are then presented to the user by formatting a web page to display the results at the user's terminal and sending the web page from the server 120 to the user's terminal.

If one of the available product satisfies the user's needs, the server 120 can initiate order processing whereby the user can purchase and arrange for shipping of the product. To process orders, the system 120 may interact with other external systems 140, 150, 160. In some cases, the system 120 will interact with other manufacturer and shipper systems to material shipments from warehouse(s) to the user. The system also may schedule shipment of raw materials from different warehouse sites to a product blending and manufacturing site where processing of the raw materials into a completed product can take place. The completed product can then be shipped to the user.

If the products presented to the user do not adequately conform to the user's requirements, the user may query the system 120 to obtain information about custom formulation of a product meeting the users requirements. In response, the system 125 queries the formulator database 125 to identify chemist, companies, or other product formulators that have skills appropriate to the development of the desired product. The system 120 may query the formulator database to locate formulators using the same product search criteria that used to query the product database. To enable this querying of the formulator database, the formulation database can store characteristics of products previously formulated by each formulator, or may identify the formulator's general category of expertise, or other data identifying the qualification of each formulators. The formulator qualification data may be matched to parameters of the user's product search request. For example, the user's product search request parameters can include a application-type parameter (e.g., solvent, coating, electrolyte, etc) which may be compared to the formulator's field-of-expertise to determine potential formulators. Formulator qualifications can also be identified by data about formulations previously developed by each formulator (i.e., the intrinsic properties of previously developed products and formulations).

After identifying a set of candidate formulators, the system 120 generates a request for proposal (RFP) setting forth the characteristics of the product desired by the user. The RFP is then distributed to each of the candidate formulators. This distribution can be automated (e.g., by e-mail, FAX, automatically generated mailings, or by postings to newsgroups and/or by messages posted to formulator login accounts).

Formulators can review the RFP and submit a response indicating whether they have an interest in accepting the RFP. The formulator's response can also propose terms (such as compensation and intellectual property ownership)

pursuant to which the formulators will perform the work. The system 120 can enable automated negotiations between the parties and the automated generation of contracts reflecting the proposed terms using web-based forms to send RFPs and to process responses from formulators. In addition, the system 120 can provide web-based contracts and other forms to handle contracting for the formulation services (including, e.g., compensation, intellectual property ownership, product delivery terms and conditions, and other contract terms). Implementations may require that on-line intellectual property and product rights licensing forms and contracts be completed when custom formulation is requested. This can help to ensure that the rights of a party receiving a custom formulation are defined. Similarly, the system 120 server can provide web-based contracts and other forms to handle contracting for the scale-up and manufacturing services (including, e.g., compensation, intellectual property ownership, product delivery terms and conditions, and other contract terms) from an integrated licensing functionality resident in a database 125. Implementation of RFPs may require that on-line intellectual property and product rights licensing forms and contracts be completed when custom products are requested and prior to when suppliers are qualified to supply. Customers receiving products resulting from queries made from system 100, or, Product Manufacturers requesting formulations or other support services, generated on system 100 hardware and facilitated through the system 120, which require the licensing of intellectual property and product rights, are provided with the licensing forms and contracts necessary to transact business. These forms and contracts are enabled by and implemented through computer-to-computer (communicating device-to-communicating device) on-line access.

Searching based on the properties of the product also can be used to locate alternatives for a known product. For example, a user may first search for a known product by entering the name of that product on a search request form. The system 100 can retrieve information about the product from the product database 125 (including the product's intrinsic properties) and send a web page to the user's terminal to present the product information to the user. The web page may include a button or link to request similar products. If the user selects the similar-product link, the system 100 may automatically query the product database using the intrinsic properties of the known product to locate similar products.

Searching for products and formulators may also be based on keyword searches, natural language searches, or other search techniques. Commercially available searching and indexing engines may also be used. For example, searching and indexing engines such as the Altavista(™), InfoSeek (™), or Microsoft Indexing Service may be used to process queries from a user. The search parameter interface presented to the user can be modified depending on the particular searching technique used in an implementation.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. Accordingly, other embodiments are within the scope of the following claims.

What is claimed is:

1. A method for chemical product acquisition, the method comprising:
   receiving a product request comprising a plurality of search parameters identifying desired properties intrinsic to a chemical product, said search parameters designated as mandatory or permissive and said desired properties including chemical compatibility properties, performance properties, chemical reactivity properties and physical properties;
   querying a product database to identify one or more commercially available chemical products conforming to the search parameters designated as mandatory; and
   sending a result of the query to a user terminal for presentation to a user, wherein the results are ordered based on the degree to which intrinsic characteristics of each of the commercially available chemical products deviate from the values of the corresponding permissive search parameters;
   in response to the sent result, receiving a request for formulation of a chemical product conforming to the search parameters;
   querying a formulator database comprising data designating qualifications of each of a plurality of formulation suppliers to select a set of potential suppliers of the requested formulation;
   automatically distributing to each formulation supplier in the selected set a request for proposal for the requested formulation; and
   automatically communicating contracts reflecting the prepared terms from the supplier.

2. The method of claim 1 wherein:
   the product database includes intrinsic chemical property information for each of a plurality of commercially available chemical products; and
   querying the product database comprises selecting chemical products based on conformance of the intrinsic chemical properties with the search parameters.

3. The method of claim 1 wherein:
   sending a result of the query to the user terminal comprises:

formatting a web page to display the result at a user terminal, and sending the web page to the user terminal.

4. The method of claim 1 wherein:

the data designating qualifications comprises data designating a field-of-expertise of each formulation supplier; and selecting the set of formulation suppliers comprises selecting based on a conformance of the request parameters with the data designating the field-of-expertise of each formulation supplier.

5. The method of claim 4 wherein:

the request parameters comprise an application-type; and selecting based on a conformance of the request parameters with the data designating the field-of-expertise of each formulation supplier comprises selecting based on a conformance of application-type and field-of-expertise data.

6. The method of claim 1 wherein:

the data designating qualifications of each of the formulation suppliers comprises a profile specifying intrinsic chemical properties of at least one formulation developed by said supplier; and selecting the set of potential suppliers comprises selecting based on a comparison of the desired intrinsic properties and the intrinsic properties of each supplier's at least one formulation.

7. A method for chemical product acquisition, the method comprising:

receiving a product request comprising a plurality of search parameters identifying desired properties intrinsic to a chemical product; said search parameters designated as mandatory or permissive and said desired properties including chemical compatibility properties, performance properties, chemical reactivity properties and physical properties;

querying a product database to identify commercially available chemical products conforming to the search parameters designated as mandatory;

sending a result of the query to a user terminal for presentation to a user, wherein the results are ordered based on the degree to which intrinsic characteristics of each of the commercially available chemical products deviate from the values of the corresponding permissive search parameters;

in response to the sent result, receiving a request for formulation of a chemical product conforming to the search parameters;

querying a formulation database to select a set of formulation suppliers skilled in formulation of chemical product conforming to the search parameters, the formulator database comprising data designating qualifications of each of a plurality of formulation suppliers;

automatically distributing to each supplier in the selected set a request for proposal for formulation of product conforming to the search parameters; and automatically communicating contracts reflecting the prepared terms from the supplier.

8. The method of claim 7 further comprising:

an integrated licensing system which completes one or more license agreements.

9. A data processing system comprising:

a product database comprising data designating intrinsic chemical properties of each of a plurality of chemical products;

a formulator database comprising data designating qualifications of each of a plurality of suppliers; and a processor coupled to the product database, the formulator database, and including a network interface operatively coupling the processor to a plurality of user terminals, and a data storage apparatus comprising instructions to perform the method comprising:

receiving a product request comprising a plurality of search parameters identifying desired properties intrinsic to a chemical product, said search parameters designated as mandatory or permissive and said desired properties including chemical compatibility properties, performance properties, chemical reactivity properties and physical properties;

querying the product database to identify one or more commercially available chemical products conforming to the search parameters designated as mandatory; and sending a result of the query at least one of the user terminals for presentation to a user, wherein the results are ordered based on the degree to which intrinsic characteristics of each of the commercially available chemical products deviate from the values of the corresponding permissive search parameters;

receiving a request for formulation of a product conforming to the search parameters in response to the sent request;

querying the formulator database to select a set of potential suppliers skilled in formulation of chemical products conforming to the search parameters;

automatically distributing to each potential supplier in the selected set a request for proposal for formulation of product conforming to the search parameters; and automatically communicating contracts reflecting the prepared terms from the supplier.

10. A data storage apparatus comprising instructions to configure a computer processor to implement a method comprising:

receiving a product request comprising a plurality of search parameters identifying desired properties intrinsic to a chemical product, said search parameters designated as mandatory or permissive and said desired properties including chemical compatibility properties, performance properties, chemical reactivity properties and physical properties;

querying a product database to identify one or more commercially available chemical products conforming to the search parameters designated as mandatory; and sending a result of the query to a user terminal for presentation to a user, wherein the results are ordered based on the degree to which intrinsic characteristics of each of the commercially available chemical products deviate from the values of the corresponding permissive search parameters;

in response to the sent result receiving a request for formulation of a chemical product conforming to the search parameters;

querying a formulator database designating qualifications of each of a plurality of formulation suppliers to select a set of potential suppliers of the request formulation;

automatically distributing to each formulation supplier in the selected set a request for proposal for the requested formulation; and automatically communicating contracts reflecting the prepared terms from the supplier.

* * * * *